US006420850B1

United States Patent
Thurman

(10) Patent No.: US 6,420,850 B1
(45) Date of Patent: Jul. 16, 2002

(54) TELECOMMUNICATION POWER DISTRIBUTION SYSTEMS AND APPARATUSES AND METHODS OF SUPPLYING POWER TO A TELECOMMUNICATION DEVICE

(76) Inventor: William O. Thurman, 10718 E. Cimmaron Dr., Spokane, WA (US) 99206-8611

( * ) Notice: Subject to any disclaimer, the term of this patent is extended or adjusted under 35 U.S.C. 154(b) by 56 days.

(21) Appl. No.: 09/715,240

(22) Filed: Nov. 17, 2000

(51) Int. Cl.[7] ................................................. H02J 7/00
(52) U.S. Cl. ........................................ 320/130; 323/288
(58) Field of Search ................................. 320/130, 128, 320/135, 166; 323/288, 282; 361/622, 631

(56) References Cited

U.S. PATENT DOCUMENTS

| | | | |
|---|---|---|---|
| 5,187,653 A | 2/1993 | Lorenz | 363/89 |
| 5,376,831 A | 12/1994 | Chen | 327/379 |
| 5,619,076 A | 4/1997 | Layden et al. | 307/48 |
| 5,886,431 A | 3/1999 | Rutigliano | 307/131 |
| 6,188,567 B1 * | 2/2001 | Borke | 361/622 |

* cited by examiner

Primary Examiner—Edward H. Tso
Assistant Examiner—Lawrence Luk
(74) Attorney, Agent, or Firm—Wells St. John P.S.

(57) ABSTRACT

Telecommunication power distribution systems and apparatuses and methods of supplying power to a telecommunication device are provided. According to one aspect, the invention includes a method of supplying electrical energy to a telecommunication device including supplying electrical current to a telecommunication device configured to perform at least one operation with respect to telecommunications, the supplying comprising using a power bus; storing electrical energy using a storage device having a plurality of operational states including a substantially discharged state; conducting electrical current intermediate the power bus and the storage device using coupling circuitry, the conducting including: first applying electrical current to the storage device provided in one of the operational states including the substantially discharged state; and second applying electrical current from the storage device to the power bus; and automatically switching operation of the coupling circuitry intermediate the first applying and the second applying.

30 Claims, 4 Drawing Sheets

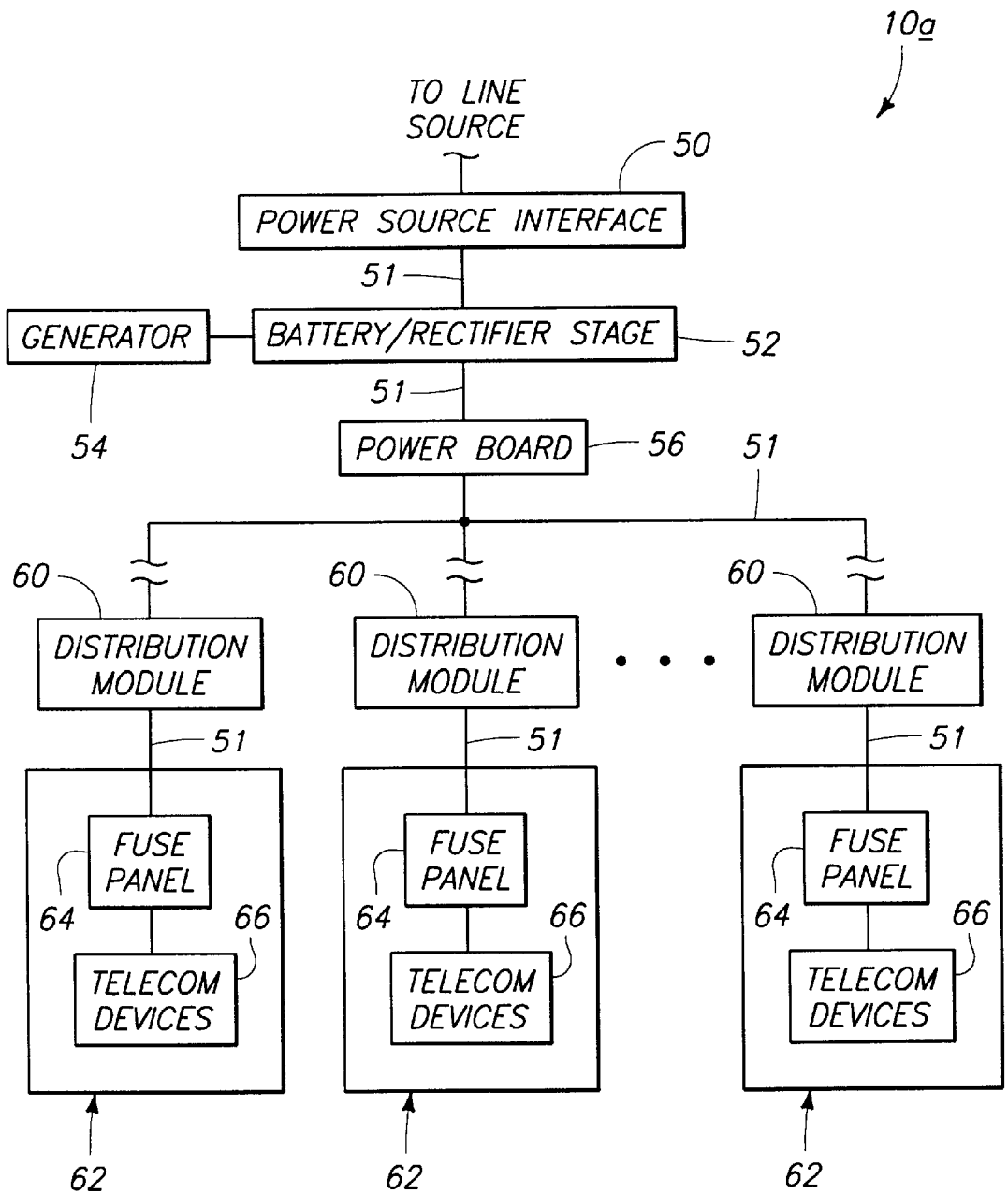

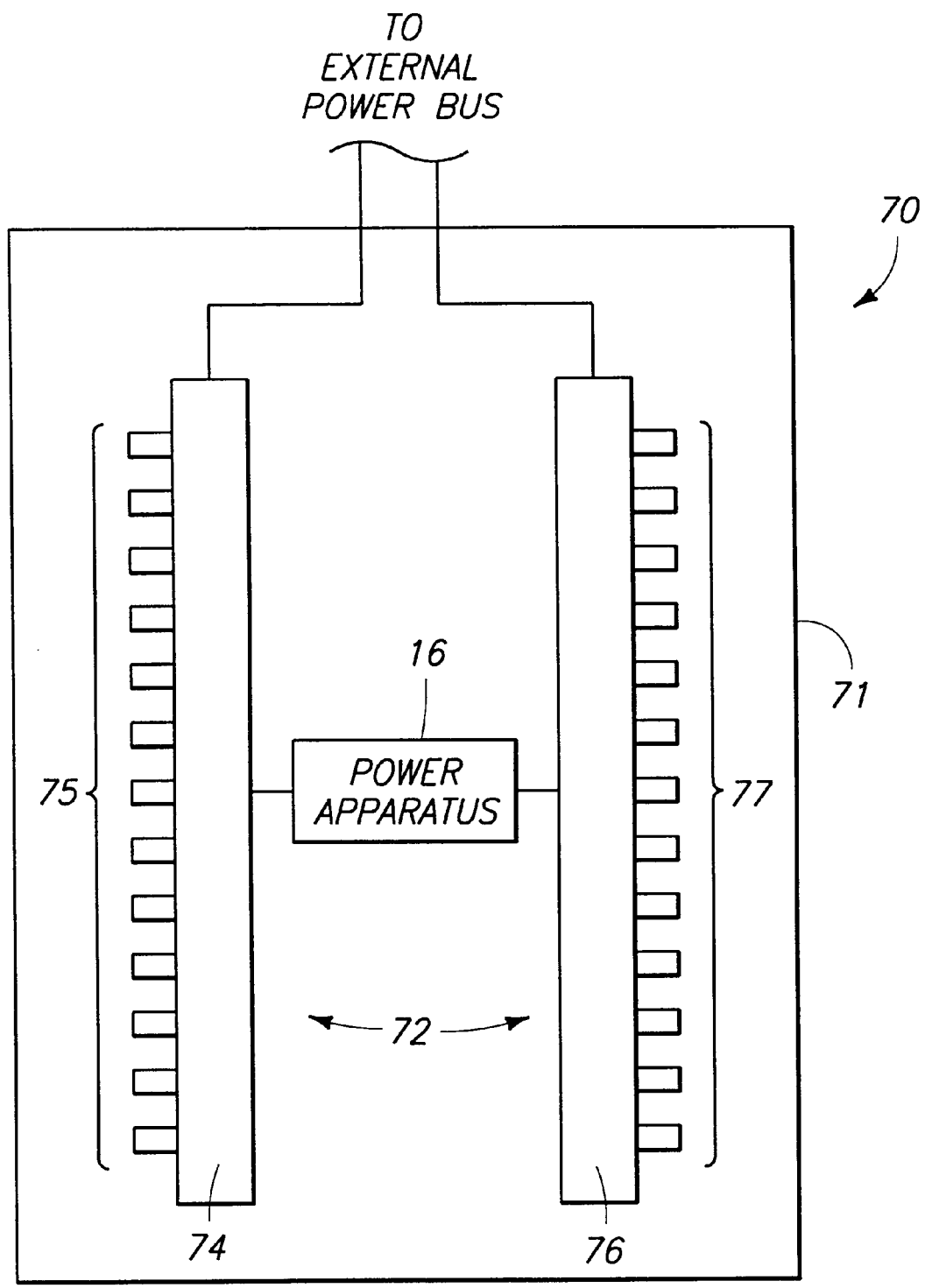

TELECOMMUNICATION POWER DISTRIBUTION SYSTEMS AND APPARATUSES AND METHODS OF SUPPLYING POWER TO A TELECOMMUNICATION DEVICE

TECHNICAL FIELD

The present invention relates to telecommunication power distribution systems and apparatuses and methods of supplying power to a telecommunication device.

BACKGROUND OF THE INVENTION

The telecommunications industry has enjoyed continued growth in recent decades. Conventional telecommunication systems include an increasing amount of hardware and equipment to handle increasing amounts of voice, and more recently data information. Accordingly, the usage of an increased number of telecommunication hardware devices has resulted in an enhanced demand for power for such devices.

An exemplary telephone company facility for implementing telecommunication operations comprises a central office where subscriber lines are joined to switching equipment for connecting subscribers (local and long distance) to one another. The number of telecommunication devices within a central office to implement such switching and other operations is considerable in many implementations. Accordingly, the power requirements for a central office, public exchange or other facility are often considerable.

In a conventional configuration, a facility may include a battery arrangement, such as a central office battery, provided as group of gel cells or lead acid batteries configured to output a fixed direct current voltage for usage within the telecommunication facility. The batteries are usually coupled with main AC line source power in conventional configurations. The batteries provide a constant temporary source of DC in the event of line failure, as well as isolation of devices of the facility from anomalies upon the power source line.

Conventional systems typically include substantial capacitors to maintain voltages within the distribution system and for other functions. Such capacitors are often large capacity devices which store considerable amount of energy for usage within the facility.

Charging of such capacitors has presented problems in conventional arrangements due to the requirement or presence of excessive charging currents required. Protection devices, switching devices, and other circuitry typically can not withstand the large charge currents drawn by the capacitors during charging from a discharged state. Further, excessive inrush current to a capacitor creates a voltage droop on the bus coupled with the telecommunication devices. The voltage droops on the bus can cause loss or interruption of service to feeders or circuits powered by the bus.

Some conventional arrangements are configured to avoid problems associated with charging of discharged capacitors. In such arrangements, an operator manually operates a switch or physically plugs in pre-charge circuitry to provide safe charging of the large capacitors in an off-line state before power is applied to the circuit. The capacitor is charged with the pre-charge circuitry. Thereafter, the operator manually switches or inserts second circuitry to provide the capacitor on-line. In some arrangements, the subsequent circuit includes a protection device such as a fuse or circuit breaker.

Such described pre-charge circuits typically include a large resistor to maintain the capacitor charging current within an acceptable range. In some pre-charge circuitry implementations, an incandescent bulb is provided to indicate the status of the charging capacitor. Once the capacitor has been indicated to be fully charged, or after a predetermined amount of time, the operator removes the pre-charge circuit and inserts the second circuitry to provide the capacitor in an on-line state.

Accordingly, in typical conventional power distribution arrangements, numerous manually operated steps are necessary to convert the capacitors intermediate an off-line condition and an on-line condition. The manual intervention is subject to operator error as well as requiring excessive time, man-power, and inconvenience in a facility of any appreciable size.

Thus there exists a need to provide improved devices and methodologies for implementing improved power distribution within telecommunication applications.

BRIEF DESCRIPTION OF THE DRAWINGS

Preferred embodiments of the invention are described below with reference to the following accompanying drawings.

FIG. 3 is a functional block diagram depicting another exemplary power distribution system arranged to supply operational electrical power to a plurality of telecommunication devices.

FIG. 4 is an illustrative representation of exemplary circuitry within a component of the telecommunication power distribution system of FIG. 3.

DETAILED DESCRIPTION OF THE PREFERRED EMBODIMENTS

Figure 1:
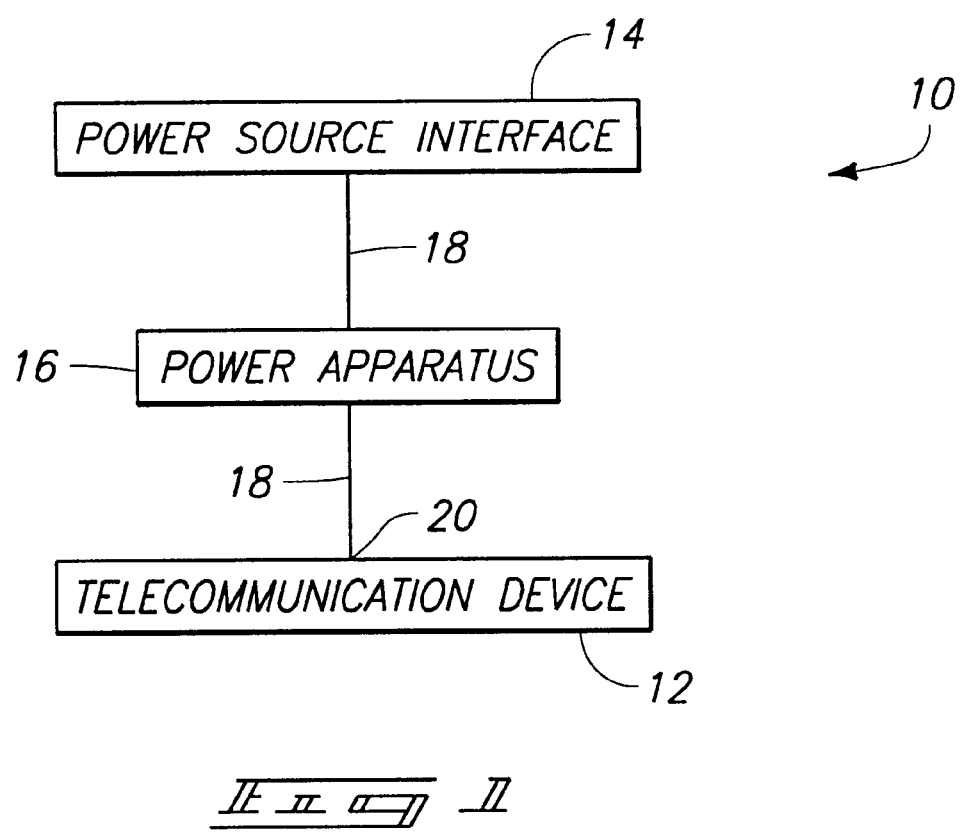
FIG. 1 is functional block diagram depicting an exemplary first configuration of a telecommunication power distribution system arranged to supply operational electrical power to a telecommunication device.

This disclosure of the invention is submitted in furtherance of the constitutional purposes of the U.S. Patent Laws "to promote the progress of science and useful arts" (Article 1, Section 8).

According to one aspect of the invention, a telecommunication power distribution system includes a first power interface adapted to receive electrical current from a power source; a second power interface adapted to couple with a telecommunication device configured to perform at least one operation with respect to telecommunications, the second power interface being configured to provide electrical current to the telecommunication device; a power bus configured to conduct electrical current intermediate the first power interface and the second power interface; a storage device coupled with the power bus and having a plurality of operational states including a substantially discharged state; and coupling circuitry coupled with the power bus and the storage device, the coupling circuitry being configured to operate in a charge mode wherein the coupling circuitry applies electrical current to the storage device from the power bus to charge the storage device provided in one of the operational states including the substantially discharged state, and to operate in a discharge mode wherein the coupling circuitry applies electrical current from the storage device to the power bus, and wherein the coupling circuitry is configured to automatically switch between the charge mode of operation and the discharge mode of operation.

According to a second aspect, the invention includes a telecommunication power apparatus including a storage device adapted to couple with a power bus configured to provide electrical current to a telecommunication device configured to perform at least one operation with respect to telecommunications, the storage device having a plurality of operational states including a substantially discharged state; and coupling circuitry coupled with the storage device and adapted to couple with the power bus, the coupling circuitry being configured to operate in a charge mode wherein the coupling circuitry applies electrical current to the storage device from the power bus to charge the storage device provided in one of the operational states including the substantially discharged state, and to operate in a discharge mode wherein the coupling circuitry applies electrical current from the storage device to the power bus, and wherein the coupling circuitry is configured to automatically switch between the charge mode of operation and the discharge mode of operation.

Another aspect of the invention includes a method of supplying electrical energy to a telecommunication device including supplying electrical current to a telecommunication device configured to perform at least one operation with respect to telecommunications, the supplying comprising using a power bus; storing electrical energy using a storage device having a plurality of operational states including a substantially discharged state; conducting electrical current intermediate the power bus and the storage device using coupling circuitry, the conducting including: first applying electrical current to the storage device provided in one of the operational states including the substantially discharged state; and second applying electrical current from the storage device to the power bus; and automatically switching operation of the coupling circuitry intermediate the first applying and the second applying.

Referring to FIG. 1, an exemplary telecommunication power distribution system 10 is depicted coupled with a telecommunication device 12. The telecommunication power distribution system 10 includes a power source interface 14 and a power apparatus 16 in the illustrated configuration.

Power source interface 14 is configured to receive electrical current from a power source (not shown). Power source interface 14 is configured to receive direct current power from the power source comprising a utility line source, battery, generator, or any other suitable power source. A rectifier (not shown in FIG. 1) is typically implemented to convert AC power to DC power if the power source comprises a line source or generator or other AC supply.

In the depicted arrangement, power distribution system 10 provides direct current power to telecommunication device 12. In exemplary arrangements, a voltage within a range of −42 to −60 Volts DC is applied to telecommunication device 12. Typical voltages applied to telecommunication device 12 by power distribution system 10 are between −52 Volts DC and −54 Volts DC.

Power apparatus 16 is coupled with a power bus 18. Power bus 18 is configured to conduct electrical current intermediate power source interface 14 and telecommunication device 12 coupled with power bus 18 at an appropriate interface 20. Interface 20 is arranged to conduct electrical current intermediate power bus 18 to telecommunication device 12.

Telecommunication device 12 is operable to perform at least one operation with respect to telecommunications. An exemplary operation includes implementing switching functions for subscriber lines, such as connecting subscriber lines to one another including local and long distance lines within a central office. Exemplary configurations of telecommunication device 12 include a line switch, digit cross connect, level monitor, etc.

Figure 2:
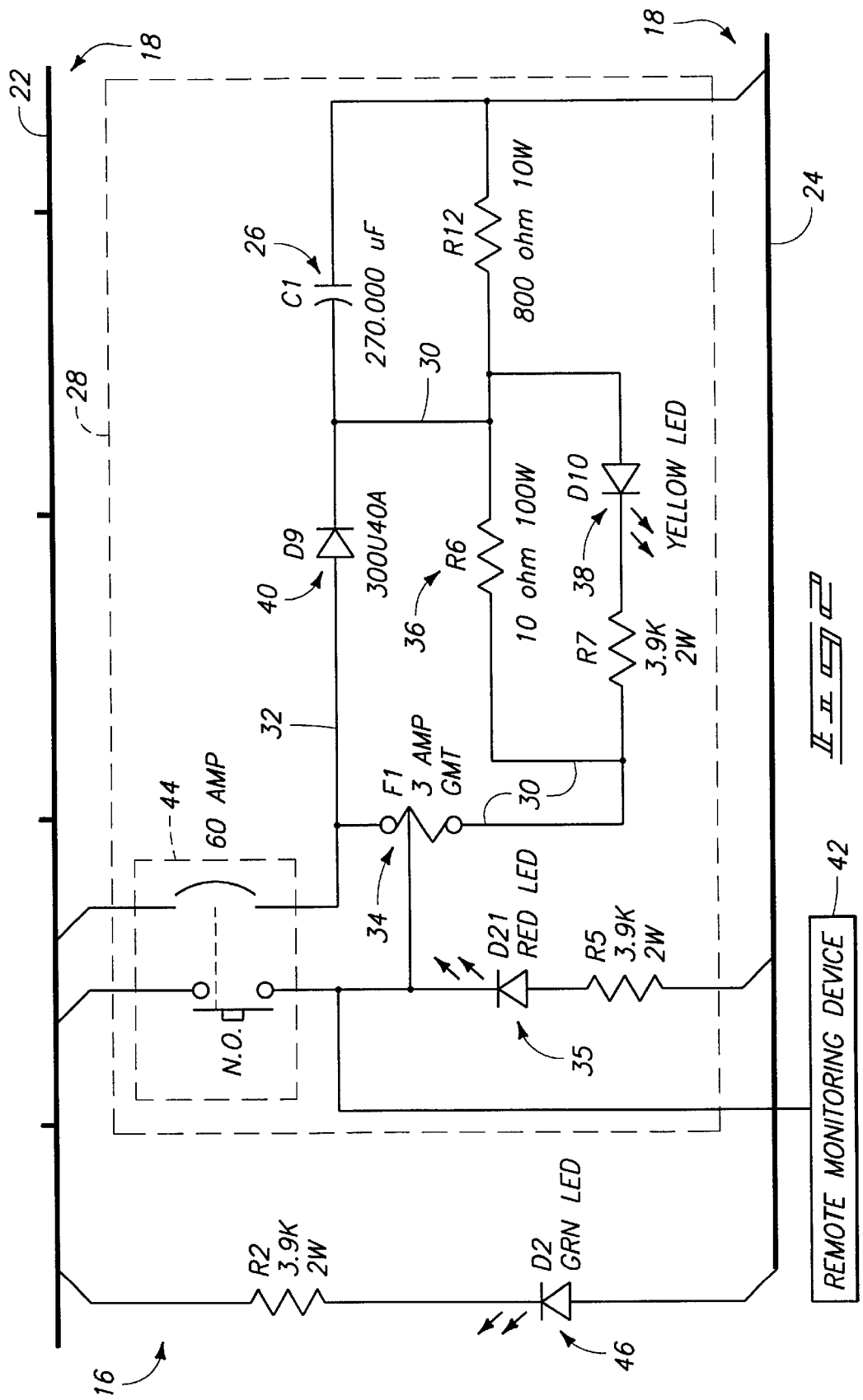
FIG. 2 is a schematic representation of any exemplary power apparatus according to aspects of the present invention.

Referring to FIG. 2, an exemplary arrangement of power apparatus 16 is shown coupled with power bus 18. The depicted components and component values of power apparatus 16 are exemplary and provided for one exemplary implementation. Alternative circuit configurations including other components or components having other values are considered in accordance with other aspects of the invention.

The depicted power bus includes a power side 22 and a return side 24. Power apparatus 16 comprises circuitry including a storage device 26 and coupling circuitry 28 coupled intermediate power side 22 and return side 24.

Storage device 26 is configured to store electrical energy and is implemented as one or more capacitor in the depicted arrangement. Storage device 26 has a plurality of operational states including a fully charged state, substantially discharged state and intermediate charged states therebetween.

Coupling circuitry 28 couples power side 22 and return side 24 of power bus 18 with storage device 26. Coupling circuitry 28 is configured to operate in a charge mode and a discharge mode in the described configuration. During operation in the charged mode, coupling circuitry 28 operates to apply electrical current from power side 22 of power bus 18 to storage device 26 to charge storage device 26. Coupling circuitry 28 operates to apply the electrical current to storage device 26 responsive to storage device 26 being in an intermediate charged state or substantially discharged state.

During operation in the discharge mode, storage device 26 applies electrical current from storage device 26 to the power side 22 of power bus 18. For example, if power bus 18 experiences a voltage droop, coupling circuitry 28 operates in the discharge mode conducting electrical current from storage device 26 to power side 22.

Coupling circuitry 28 comprises a plurality of paths 30, 32 intermediate power side 22 of power bus 18 and storage device 26. The depicted paths 30, 32 are referred to as a charge path and a discharge path 32, respectively, in the illustrated embodiment.

Charge path 30 is configured to apply electrical current to storage device 26 from the power side 22 of power bus 18. As shown, charge path 30 includes a protection device 34 and a resistive device 36. Protection device 34 is configured to prevent conduction of electrical current overages to storage device 26 from power bus 18. The depicted protection device 34 is implemented as a GMT fuse which operates to protect circuitry within charge path 30 in the described embodiment.

Protection device 34 is coupled with an indicator 35 configured to indicate a failure condition within coupling circuitry 28. For example upon failure of protection device 34, indicator 35 comprising a light emitting diode (LED) visually indicates the failure condition within coupling circuitry 28. In the depicted arrangement of power apparatus 16, protection device 34 also provides an auxiliary alarm switch to a protection device 44 (described below) as shown.

In addition, a remote monitoring device 42 is coupled with coupling circuitry 28 according to aspects of the invention. Remote monitoring device 42 is implemented as a computer or other monitoring device for monitoring operation within telecommunication power distribution system 10 and alarm conditions occurring therein. Upon indication of an alarm, device 42 automatically takes appropriate remedial measures or instructs an operator of the status monitored thereby.

Provision of protection device 34 within the depicted circuitry also provides the additional benefit of allowing implementation of resistive device 36 as a component having less wattage capacity (e.g., 100 W in the illustrated embodiment) to protect against shortages within storage device 26 or other failures.

Resistive device 36, implemented as a 10 Ohm resistor in the depicted embodiment, is configured to limit the rate of application of electrical current to storage device 26. In conditions wherein storage device 26 is provided in a substantially discharged state, and thus appears as a substantially shorted circuit, resistive device 36 operates to protect internal components within power apparatus 16 from excessive inrush current which would otherwise occur responsive to storage device 26 being in a substantially discharge state.

An indicator 38 is provided to indicate operations of coupling circuitry 28 in the charge mode. Indicator 38 comprises a LED in the depicted configuration operable to provide a visual indication of charging current. Indicator 38 is illuminated during charging of storage device 26 until a point wherein the LED is not sufficiently forward biased indicating that storage device 26 is at or near a full charge state.

Discharge path 32 is configured to apply electrical current to power side 22 of power bus 18 from storage device 26 during operation of coupling circuitry 28 in the discharge mode. Discharge path 32 includes a current direction device 40 configured to permit electrical current to flow only from storage device 26 to power side 22 of power bus 18. In the illustrated embodiment, current direction device 40 is implemented as a diode which becomes forward biased during a voltage droop upon power bus 18. Coupling circuitry 28 is configured to apply substantially instantaneous current from storage device 26 to power bus 18 during operation in the discharge mode.

Coupling circuitry 28 is configured to automatically switch between the charge mode of operation and the discharge mode of operation both described herein. As illustrated, coupling circuitry 28 is configured to implement the automatic switching operations between the charge and discharge modes responsive to the state of power bus 18 according to aspects of the present invention.

During normal operations (e.g., sufficient and proper voltage upon power bus 18) coupling circuitry 28 operates in the charge mode to maintain storage device 26 at a substantially full charged state of operation. Upon the occurrence of a voltage droop or other voltage deficient situation upon power bus 18, coupling circuitry 28 automatically switches to the discharge mode of operation to maintain the voltage upon power bus 18. Following return of sufficient and proper voltage to power bus 18, coupling circuitry 28 automatically returns to the charge mode of operation.

As shown in FIG. 2, the depicted coupling circuitry 28 additionally comprises a protection device 44 intermediate storage device 26 and power side 22 of power bus 18. Protection device 44 is configured to prevent conduction of electrical current overages intermediate storage device 26 and the power bus 18. Protection device 44 is implemented as a circuit breaker in the depicted arrangement. Other configurations of device 44, such as a fuse, are possible.

An indicator 46 is provided intermediate power and return sides 22, 24 of power bus 18. Indicator 46 is implemented as an LED in the depicted embodiment configured to indicate the presence of power within power bus 18.

Referring to FIG. 3, another configuration of a telecommunication power distribution system is depicted as a reference 10a according to additional aspects of the present invention. Telecommunication power distribution system 10a is arranged in a tree configuration in the depicted arrangement. In one configuration, telecommunication power distribution system 10a is implemented within a central office, or other telecommunication facility. Other applications of system 10a are possible.

The illustrated system 10a includes a power source interface 50, power bus 51, battery/rectifier stage 52, generator 54, power board 56, plural distribution modules 60, and plural device modules 62. Power source interface 50 is configured to couple a utility line source such as an alternating current source from a power company with power bus 51. Power bus 51 corresponds to power bus 18 described above in the desired embodiment.

Battery/rectifier stage 52 is configured to convert alternating current electricity into direct current electricity for usage within system 10a. Generator 54 is configured to provide back-up alternating current electricity in the event of outages within the line source. Stage 52 also includes batteries in the illustrated embodiment to provide line conditioning with respect to line source power and power from generator 54, as well as to provide any necessary instantaneous power to power bus 51.

Power board 56 is implemented as a distribution panel in an exemplary embodiment which includes cutoff switches or disconnect switches, for example. Power board 56 passes electrical power to plural distribution modules 60 using power bus 51.

In some arrangements, plural distribution modules 60 are remotely located from power board 56. Power bus 51 intermediate power board 56 and respective distribution modules 60 is implemented as a plurality of feeder lines in the depicted exemplary arrangement. 24

Distribution modules 60 are implemented as battery distribution fuse/circuit breaker (BDF/BDCB) panels according to exemplary aspects of the present invention. Distribution modules 60 are operable to provide filtering of power upon power bus 51 as well as protect to devices within respective device modules 62 in the event of power overages or other disturbances upon power bus 51.

Distribution modules 60 are coupled with a plurality of respective device modules 62 via respective power buses 51. Device modules 62 are individually implemented as a battery distribution fuse/circuit breaker module or bay in an exemplary configuration.

An individual device module 62 includes a fuse panel 64 and one or more telecommunication device 66. Fuse panel 64 is configured to receive power from the respective power bus 51 and supply received power to appropriate telecommunication devices 66. Fuse panel 64 also operates to protect telecommunication devices 66 from overage conditions on power bus 51 from the respective distribution module 60. Telecommunication devices 66 are configured to perform operations with respect to telecommunications including switching, routing and other operations as described above with reference to telecommunication devices 12.

Power apparatus 16 described above with reference to FIG. 2 is implemented within one or more of components of the depicted telecommunication power distribution system 10a. For example, power apparatus 16 is implemented within power board 56, individual distribution modules 60, andor individual fuse panels 64.

Storage device 26 (FIG. 2) implemented as a capacitor in the described embodiment of power apparatus 16 enables clearing of other fuses coupled with power bus 51, maintenance of voltage power upon bus 51, offsetting of reactance present within power bus 51 (e.g., introduced from feeder lines of any significant distance), and filtering operations to smooth transients resulting from switching or other operations of components coupled with power bus 51.

Depending upon a given application of power apparatus 16 within various components 56, 60, 64, discrete or other devices of power apparatus 16 are tailored to the specific application. For example, if power apparatus 16 is implemented within power board 56, protection device 44 is implemented as a 150 Amp device as opposed to implementations of apparatus 16 within distribution module 60 or fuse panels 64 wherein protection device 44 is implemented as a 60 Amp circuit breaker. According to aspects of the invention, power apparatus 16 is tailored to the specific application within telecommunication power distribution system 10a.

In other arrangements, power apparatus 16 is configured for operation within a bus capacitance module (not shown) which may be added as an accessory for a battery distribution fuse/circuit breaker bay or module or other application.

Referring to FIG. 4, an arrangement is illustrated corresponding to exemplary implementations of power apparatus 16 within various components of system 10a. More specifically, the arrangement of FIG. 4 depicts power apparatus 16 implemented within a proper component, such as power board 56, distribution module 60, fuse panel 64, etc. Reference 70 is intended to refer to power circuitry of any one of such components 56, 60, 64 of system 10a or other component for implementation of power apparatus 16 without the associated respective functional component circuitry (e.g., fuses, circuit breakers, etc.) of such components.

As shown, component 70 includes a housing 71 provided to house an internal power bus 72 coupled with power apparatus 16. In other arrangements, a plurality of power apparatuses 16 are provided within a given component 70. Internal power bus 72 includes a power side 74 and a return side 76. Internal power bus 72 is coupled in series or parallel with an external power bus, such as power bus 51, for example.

Power and return sides 74, 76 include a plurality of respective connections 75, 77 to couple with appropriate respective devices. For example, if component 70 corresponds to power board 56 of FIG. 3, is connections 75, 77 are coupled to feeder lines of power bus 51 for providing power to respective distribution modules 60. Alternatively, if component 70 is implemented within a fuse panel 64 of FIG. 3, individual connections 75, 77 are coupled with respective telecommunication devices 66 and configured to provide power thereto.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed:

1. A telecommunication power distribution system comprising:
    a first power interface adapted to receive electrical current from a power source;
    a second power interface adapted to couple with a telecommunication device configured to perform at least one operation with respect to telecommunications, the second power interface being configured to provide electrical current to the telecommunication device;
    a power bus configured to conduct electrical current intermediate the first power interface and the second power interface;
    a storage device coupled with the power bus and having a plurality of operational states including a substantially discharged state; and
    coupling circuitry coupled with the power bus and the storage device, the coupling circuitry being configured to operate in a charge mode wherein the coupling circuitry applies electrical current to the storage device from the power bus to charge the storage device provided in one of the operational states including the substantially discharged state, and to operate in a discharge mode wherein the coupling circuitry applies electrical current from the storage device to the power bus, and wherein the coupling circuitry is configured to automatically switch between the charge mode of operation and the discharge mode of operation.

2. The system of claim 1 wherein the coupling circuitry is configured to automatically switch between the charge mode of operation and the discharge mode of operation responsive to the state of the power bus.

3. The system of claim 1 wherein the coupling circuitry is configured to apply substantially instantaneous current from the storage device to the power bus during operation in the discharge mode.

4. The system of claim 1 wherein the coupling circuitry is configured to operate in the charge mode to apply electrical current to the storage device provided in another operational state comprising an intermediate charged state.

5. The system of claim 1 wherein the coupling circuitry comprises a plurality of paths intermediate the power bus and the storage device including a charge path configured to apply electrical current to the storage device from the power bus and a discharge path configured to apply electrical current to the power bus from the storage device.

6. The system of claim 5 wherein the charge path comprises a resistive device configured to limit the rate of application of electrical current to the storage device.

7. The system of claim 5 wherein the charge path comprises a protection device configured to prevent conduction of electrical current overages to the storage device from the power bus.

8. The system of claim 5 wherein the discharge path comprises a current direction device configured to permit electrical current to flow only from the storage device to the power bus.

9. The system of claim 1 wherein the storage device comprises at least one capacitor.

10. The system of claim 1 further comprising an indicator configured to indicate operation of the coupling circuitry in the charge mode.

11. The system of claim 1 further comprising an indicator configured to indicate a failure condition within the coupling circuitry.

12. The system of claim 1 wherein the coupling circuitry comprises a protection device configured to prevent conduction of electrical current overages intermediate the storage device and the power bus.

13. A telecommunication power apparatus comprising:
- a storage device adapted to couple with a power bus configured to provide electrical current to a telecommunication device configured to perform at least one operation with respect to telecommunications, the storage device having a plurality of operational states including a substantially discharged state; and
- coupling circuitry coupled with the storage device and adapted to couple with the power bus, the coupling circuitry being configured to operate in a charge mode wherein the coupling circuitry applies electrical current to the storage device from the power bus to charge the storage device provided in one of the operational states including the substantially discharged state, and to operate in a discharge mode wherein the coupling circuitry applies electrical current from the storage device to the power bus, and wherein the coupling circuitry is configured to automatically switch between the charge mode of operation and the discharge mode of operation.

14. The apparatus of claim 13 wherein the coupling circuitry is configured to automatically switch between the charge mode of operation and the discharge mode of operation responsive to the state of the power bus.

15. The apparatus of claim 13 wherein the coupling circuitry is configured to apply substantially instantaneous current from the storage device to the power bus during operation in the discharge mode.

16. The apparatus of claim 13 wherein the coupling circuitry is configured to operate in the charge mode to apply electrical current to the storage device provided in another operational state comprising an intermediate charged state.

17. The apparatus of claim 13 wherein the coupling circuitry comprises a plurality of paths intermediate the power bus and the storage device including a charge path configured to apply electrical current to the storage device from the power bus and a discharge path configured to apply electrical current to the power bus from the storage device.

18. The apparatus of claim 17 wherein the charge path comprises a resistive device configured to limit the rate of application of electrical current to the storage device.

19. The apparatus of claim 17 wherein the charge path comprises a protection device configured to prevent conduction of electrical current overages to the storage device from the power bus.

20. The apparatus of claim 17 wherein the discharge path comprises a current direction device configured to permit electrical current to flow only from the storage device to the power bus.

21. The apparatus of claim 13 wherein the storage device comprises at least one capacitor.

22. A method of supplying electrical energy to a telecommunication device comprising:
- supplying electrical current to a telecommunication device configured to perform at least one operation with respect to telecommunications, the supplying comprising using a power bus;
- storing electrical energy using a storage device having a plurality of operational states including a substantially discharged state;
- conducting electrical current intermediate the power bus and the storage device using coupling circuitry, the conducting including:
  - first applying electrical current to the storage device provided in one of the operational states including the substantially discharged state; and
  - second applying electrical current from the storage device to the power bus; and
- automatically switching operation of the coupling circuitry intermediate the first applying and the second applying.

23. The method of claim 22 wherein the automatically switching comprises automatically switching responsive to the state of the power bus.

24. The method of claim 22 wherein the second applying comprises applying substantially instantaneous electrical current from the storage device to the power bus.

25. The method of claim 22 wherein the first applying comprises applying electrical current to the storage device in another operational state comprising an intermediate charged state.

26. The method of claim 22 wherein the first applying and second applying comprise applyings using respective ones of a charge path and a discharge path.

27. The method of claim 26 further comprising limiting a direction of flow of electrical current within the discharge path.

28. The method of claim 22 further comprising limiting the rate of application of electrical current to the storage device during the first applying.

29. The method of claim 22 wherein the storing comprises storing using the storage device comprising at least one capacitor.

30. The method of claim 22 further comprising indicating the first applying.

* * * * *

UNITED STATES PATENT AND TRADEMARK OFFICE
CERTIFICATE OF CORRECTION

PATENT NO. : 6,420,850 B1  
DATED : July 16, 2002  
INVENTOR(S) : Bill Thurman

It is certified that error appears in the above-identified patent and that said Letters Patent is hereby corrected as shown below:

Column 6,  
Line 42, please delete "24" after ".".  
Line 47, please delete "to" after "protect" and insert -- to -- after "as".

Column 7,  
Line 54, please delete "is" after "3,".

Signed and Sealed this

Twenty-ninth Day of July, 2003

JAMES E. ROGAN  
*Director of the United States Patent and Trademark Office*